United States Patent
Ge et al.

(10) Patent No.: US 11,985,372 B2
(45) Date of Patent: May 14, 2024

(54) INFORMATION PUSHING METHOD AND APPARATUS

(71) Applicant: SAMSUNG ELECTRONICS CO., LTD., Suwon-si (KR)

(72) Inventors: Lingling Ge, Nanjing (CN); Liming Shen, Nanjing (CN); Ying Ge, Nanjing (CN); Yan Liu, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/080,238

(22) Filed: Dec. 13, 2022

(65) Prior Publication Data

US 2023/0188776 A1 Jun. 15, 2023

Related U.S. Application Data

(63) Continuation of application No. PCT/KR2022/020061, filed on Dec. 9, 2022.

(30) Foreign Application Priority Data

Dec. 13, 2021 (CN) .......................... 202111521389.0

(51) Int. Cl.
*H04N 21/266* (2011.01)
*G06F 16/9535* (2019.01)
(Continued)

(52) U.S. Cl.
CPC ..... *H04N 21/2668* (2013.01); *G06F 16/9535* (2019.01); *G06Q 30/0271* (2013.01);
(Continued)

(58) Field of Classification Search
CPC ............. H04N 21/2668; H04N 21/251; H04N 21/4126; H04N 21/812; G06F 16/9535;
(Continued)

(56) References Cited

U.S. PATENT DOCUMENTS 8,725,569 B2   5/2014  Liang et al.
10,200,822 B2  2/2019  Su et al.
(Continued)

FOREIGN PATENT DOCUMENTS

JP      2016-009215 A    1/2016
KR   10-2019-0001127 A    1/2019
(Continued)

OTHER PUBLICATIONS

Laurini, "Convex Hull", 2015, Climate Change Biology (Second Edition), ScienceDirect, 25 pages total.

(Continued)

*Primary Examiner* — Timothy R Newlin
(74) *Attorney, Agent, or Firm* — Sughrue Mion, PLLC

(57) ABSTRACT

An information pushing method, including receiving an information pushing request of an offline service provider; acquiring target information to be pushed and related information about the offline service provider based on the information pushing request; and based on determining that information pushing is to be performed, pushing information to a user such that the pushed information matches with user interests, based on the target information, the related information about the offline service provider, a service area of the user, and an interest probability distribution of the user in the service area, wherein the service area and the interest probability distribution are obtained based on offline visit record information reported by the user, and wherein the offline visit record information is generated based on service attribute information collected by a mobile terminal device of the user at offline service providers visited by the user.

15 Claims, 12 Drawing Sheets

(51) Int. Cl.
 *G06Q 30/0251* (2023.01)
 *H04N 21/25* (2011.01)
 *H04N 21/2668* (2011.01)
 *H04N 21/41* (2011.01)
 *H04N 21/81* (2011.01)

(52) U.S. Cl.
 CPC ....... *H04N 21/251* (2013.01); *H04N 21/4126* (2013.01); *H04N 21/812* (2013.01)

(58) Field of Classification Search
 CPC ............ G06F 16/9537; G06Q 30/0271; G06Q 30/0261
 See application file for complete search history.

(56) References Cited

U.S. PATENT DOCUMENTS

| | | | | |
|---|---|---|---|---|
| 10,943,457 | B2* | 3/2021 | Asano | G08B 29/185 |
| 2002/0026361 | A1* | 2/2002 | Blom | G06Q 30/0273 |
| | | | | 705/14.69 |
| 2007/0006098 | A1* | 1/2007 | Krumm | H04W 4/18 |
| | | | | 715/825 |
| 2008/0215351 | A1 | 9/2008 | Sakaguchi et al. | |
| 2009/0005987 | A1* | 1/2009 | Vengroff | H04L 67/306 |
| | | | | 705/7.34 |
| 2009/0068992 | A1* | 3/2009 | Takehara | H04L 67/53 |
| | | | | 455/412.1 |
| 2010/0082397 | A1* | 4/2010 | Blegen | G06Q 30/0261 |
| | | | | 705/14.58 |
| 2011/0022469 | A1* | 1/2011 | Fukui | G06Q 30/0261 |
| | | | | 705/14.58 |
| 2011/0035284 | A1* | 2/2011 | Moshfeghi | H04W 4/029 |
| | | | | 705/14.58 |
| 2011/0258049 | A1 | 10/2011 | Ramer et al. | |
| 2011/0313956 | A1* | 12/2011 | Abe | G06F 16/90344 |
| | | | | 706/12 |
| 2012/0136865 | A1* | 5/2012 | Blom | G06F 16/29 |
| | | | | 707/E17.046 |
| 2012/0310737 | A1* | 12/2012 | Song | G06Q 30/0261 |
| | | | | 705/14.57 |
| 2013/0006777 | A1* | 1/2013 | Krishnareddy | G06Q 30/0261 |
| | | | | 705/14.66 |
| 2013/0198003 | A1* | 8/2013 | Hiyama | G09F 27/00 |
| | | | | 705/14.58 |
| 2014/0222570 | A1* | 8/2014 | Devolites | H04W 4/02 |
| | | | | 705/14.58 |
| 2015/0052132 | A1* | 2/2015 | Ching | G06F 16/2282 |
| | | | | 707/736 |
| 2015/0133209 | A1* | 5/2015 | Patterson | G06Q 30/0261 |
| | | | | 463/31 |
| 2015/0170210 | A1 | 6/2015 | Rhee et al. | |
| 2016/0019592 | A1* | 1/2016 | Muttineni | H04W 4/029 |
| | | | | 705/14.58 |
| 2016/0104212 | A1 | 4/2016 | Saligrama Ananthanarayana et al. | |
| 2016/0150370 | A1* | 5/2016 | Gillespie | H04L 67/55 |
| | | | | 455/456.3 |
| 2016/0169696 | A1* | 6/2016 | Butts, III | G06Q 30/0261 |
| | | | | 701/438 |
| 2016/0183060 | A1* | 6/2016 | Seyde | H04W 4/029 |
| | | | | 455/456.3 |
| 2017/0068902 | A1* | 3/2017 | Kirshner | G06F 30/20 |
| 2017/0161764 | A1 | 6/2017 | Zhang et al. | |
| 2017/0318430 | A1* | 11/2017 | Ganti | G06F 18/23 |
| 2018/0232764 | A1* | 8/2018 | Dotan-Cohen | H04L 67/306 |
| 2018/0330406 | A1* | 11/2018 | Deluca | H04N 21/25841 |
| 2020/0117339 | A1* | 4/2020 | Amitay | H04L 67/12 |
| 2020/0357023 | A1* | 11/2020 | Tabara | G06Q 30/0259 |
| 2020/0404448 | A1 | 12/2020 | Park et al. | |
| 2021/0233110 | A1* | 7/2021 | Ye | G06Q 30/0255 |
| 2021/0377611 | A1* | 12/2021 | Bress | G06N 7/01 |

FOREIGN PATENT DOCUMENTS

| | | |
|---|---|---|
| KR | 10-2020-0097571 A | 8/2020 |
| KR | 10-2021-0015465 A | 2/2021 |

OTHER PUBLICATIONS

"B-spline Curves: Closed Curves", 2018, 3 pages total.
Notification of Transmittal of the International Search Report and the Written Opinion of the International Searching Authority, or the Declaration, International Search Report & Written Opinion (PCT/ISA/220, 210 & 237) dated Mar. 30, 2023 from the International Searching Authority in International Application No. PCT/KR2022/020061.

* cited by examiner

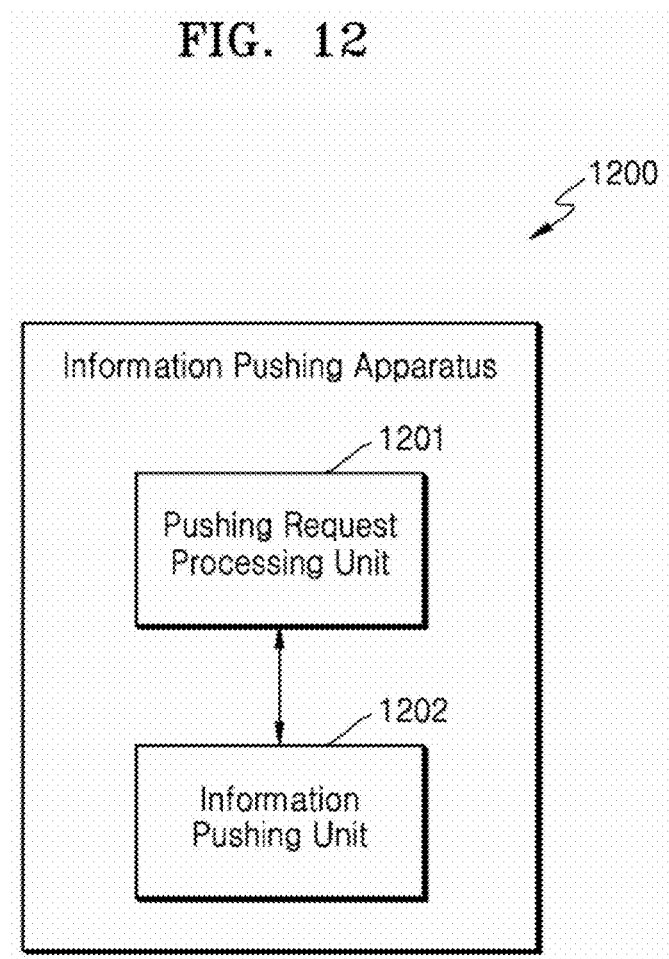

INFORMATION PUSHING METHOD AND APPARATUS

CROSS REFERENCE TO RELATED APPLICATIONS

This application is a bypass continuation of International Application No. PCT/KR2022/020061, filed on Dec. 9, 2022 in the Korean Intellectual Property Receiving Office, which claims priority to Chinese Patent Application No. 202111521389.0, filed on Dec. 13, 2021, in the China National Intellectual Property Administration, the disclosures of which are incorporated by reference herein in their entireties.

BACKGROUND

1. Field

The disclosure relates to computer application technologies, and more particularly, to an information pushing method and apparatus.

2. Description of Related Art

With the increasing development of virtual information, electronic devices (e.g. mobile phones) can provide rich personalized services. Most of the services are virtual products. They meet the needs of users' indoor lives, but ignore physical stores which are necessary in people's lives, and users do not know what is more interesting is happening offline.

An existing information pushing scheme of offline service providers may include pushing information using terminal devices of information receivers. For example, using information pushing servers, service provision related information which is to be pushed by the offline service providers is sent to television sets of the information receivers, and the service provision related information is played by the television sets.

However, the existing information pushing scheme of the offline service providers has a problem of low matching with the needs of the information receivers. For example, the offline service providers cannot conveniently record users' visit data, and then know which users are interested in their services based on the users' visit data, as online service providers do. Thus, when pushing information for the offline service providers, information of the offline service providers cannot be pushed to information receivers who are interested in services corresponding to the information according to interest features of the information receivers. As a result the pushed information of the offline service providers often cannot be matched with the demands of the information receivers, which reduces the probability that the information receivers request for services from the corresponding offline service providers based on the received pushed information, further reduces the effectiveness of information pushing, wastes information pushing resources, and increases the information pushing costs of the offline service providers. Meanwhile, the information receivers may receive a large amount of useless information, which degrades the user experience.

SUMMARY

Additional aspects will be set forth in part in the description which follows and, in part, will be apparent from the description, or may be learned by practice of the presented embodiments.

In accordance with an aspect of the disclosure, an information pushing method includes receiving an information pushing request of an offline service provider; acquiring target information to be pushed and related information about the offline service provider based on the information pushing request. An information pushing method includes, based on determining that information pushing is to be performed, pushing information to a user such that the pushed information matches with user interests, based on the target information, the related information about the offline service provider, a service area of the user, and an interest probability distribution of the user in the service area. The service area and the interest probability distribution are obtained based on offline visit record information reported by the user. The offline visit record information is generated based on service attribute information collected by a mobile terminal device of the user at offline service providers visited by the user.

In accordance with an aspect of the disclosure, an information pushing apparatus includes a memory. An information pushing apparatus includes at least one processor configured to receive an information pushing request of an offline service provider, and to acquire target information to be pushed and related information about the offline service provider based on the information pushing request. An information pushing apparatus includes at least one processor configured to, based on determining that information pushing is to be performed, push information to a user such that the pushed information matches with user interests, based on the target information, the related information about the offline service provider, a service area of the user, and an interest probability distribution of the user in the service area. The service area and the interest probability distribution are obtained based on offline visit record information reported by the user. The offline visit record information is generated based on service attribute information collected by a mobile terminal device of the user at offline service providers visited by the user.

In accordance with an aspect of the disclosure, a computer-readable storage medium, stores computer-readable instructions which, when executed at least one processor, cause the at least one processor to perform the information pushing methods discussed herein.

In accordance with an aspect of the disclosure, a non-transitory computer program product stores computer instructions which, when executed by at least one processor, cause the at least one processor to perform the information pushing method discussed herein.

BRIEF DESCRIPTION OF DRAWINGS

The above and other aspects, features, and advantages of certain embodiments of the present disclosure will be more apparent from the following description taken in conjunction with the accompanying drawings, in which:

FIG. 12 is a schematic structure diagram of an apparatus according to an embodiment.

DETAILED DESCRIPTION

Figure 1:
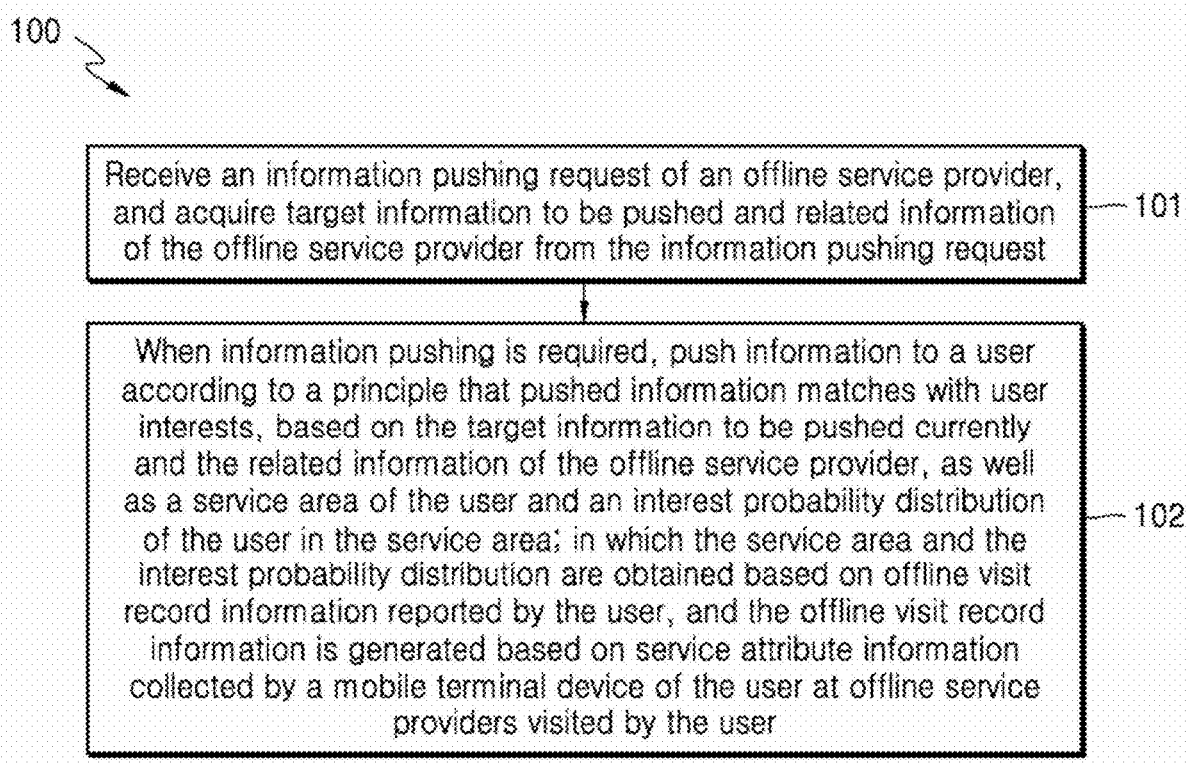
FIG. 1 is a schematic diagram of a process of pushing information according to an embodiment.

In order to make objectives, technical solutions and advantages clearer, embodiments will be further described in detail below with reference to the accompanying drawings.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a schematic diagram of process 100 of pushing information, according to an embodiment. In embodiments, an information push may be a communication of information, for example by transmitting or sending the information, where the communication is initiated by the originator or publisher of the information. In embodiments, the information may be sent or transmitted using any communication scheme, for example using any type of wired or wireless transmission.

As shown in FIG. 1, in operation 101, an information pushing request of an offline service provider may be received, and target information to be pushed and related information about the offline service provider may be acquired from the information pushing request.

In embodiments, the information pushing request sent by the offline service provider may carry the target information requested to be pushed, and the related information about the offline service provider which sends the request, to enable an apparatus for information pushing to make an information pushing decision based on these pieces of information in combination with currently stored interest feature data of each user (for example a service area and an interest probability distribution in the area), in order to push information which is of interest to the user, to the user as far as possible, and reduce the occurrence of a situation where information that is not of interest to the user is pushed to the user.

For example, the related information about the offline service provider may be set according to information matching requirements in an information pushing strategy adopted in a subsequent information pushing process.

In one implementation, the related information about the offline service provider may include, but is not limited to, service type information, identification information and/or location information about the offline service provider, etc. For example, only the identification information or location information about the offline service provider may be included, and the information may be used as an index to find other related information needed for information matching from pre-stored offline service provider data.

The identification information about the offline service provider may be used to distinguish the offline service provider from a different offline service provider, and may for example be an identification code pre-allocated to the offline service provider, or a terminal device tag deployed at the offline service provider (such as an identifier of a terminal device that sends service attribute information in an area where the offline service provider is located).

As further shown in FIG. 1, in operation 102, when information pushing is required, or when it is otherwise determined that information pushing is to be performed, information may be pushed to a user according to a principle that pushed information matches with user interests, based on the target information to be pushed currently and the related information about the offline service provider, as well as a service area of the user and an interest probability distribution of the user in the service area. In embodiments, the pushed information of the offline service provider may be information that is from or provided by the offline service provider.

The service area and the interest probability distribution may be obtained based on offline visit record information reported by the user, and the offline visit record information may be generated based on service attribute information collected by a mobile terminal device of the user at offline service providers visited by the user.

Operation 102 may be used to perform an information pushing process for each candidate user to whom the target information is to be pushed. For example, in one implementation, when it is determined that information pushing is required according to a preset information pushing trigger mechanism, a service area of a candidate user and an interest probability distribution of the candidate user in the service area may be acquired from a database for storing user interest feature data, and information may be pushed to the candidate user according to the principle that pushed information matches with user interests, based on these data and related information about the target information to be pushed, in order to improve the probability that target information pushed to a user matches with user interests, and reduce the condition where information that is not of interest to a user is pushed to the user.

In practical applications, a timing for the triggering of the above-described information pushing may be set according to an information pushing trigger mechanism. For example, the timing may be, but is not limited to, triggering the information pushing immediately upon receiving an information pushing request of a new offline service provider, or triggering the information pushing periodically based on information pushing requests that may be currently in effect according to a specified period.

In practical applications, it may be determined which target information needs to be pushed currently based on the received and effective information pushing request.

In one implementation, candidate users to whom the target information is to be pushed may be set based on a user set corresponding to user interest feature data which has been stored currently, and may be, for example, all users in the user set, or subsets of the user set. For example, users matched with the location of an offline service provider corresponding to target information may be selected to generate a candidate user set, e.g., users with a service area in Shanghai. As another example, users with an information pushing authorization may be selected to generate a candidate user set. These examples are merely illustrative and embodiments are not limited thereto.

Because a user may not visit an offline service provider through a network, in contrast to the way in which the user visits an online service provider, interest data of the corresponding user may not be conveniently obtained according to online browsing traces of the user or transaction behavior data recorded by a dedicated application or app. Therefore, a mobile terminal device carried by the user may be used to collect related information about offline service providers visited by the user at any time, and generate a corresponding visit record, in order to facilitate analyzing the visit record of the user to obtain user interest feature data. As a result, matching for information pushing may be performed for the user based on the interest feature data.

For example, the mobile terminal device may be, but is not limited to, an intelligent device such as a mobile phone, a smart watch, a sports bracelet, a headset, or any other device capable of receiving information sent by the offline service provider visited by the user.

In one implementation, in order to improve the effectiveness and accuracy of generating offline visit record information by the mobile terminal device, the offline visit record information may be specifically generated according to the example discussed below.

If the mobile terminal device detects the service attribute information about the offline service provider in an area where the offline service provider is located, and a duration of continuously detecting the service attribute information is longer than a specified duration, the mobile terminal device determines that the user visits the offline service provider once, records the duration as a visit duration of the current visit, and generates offline visit record information about the current visit.

The service attribute information may include identification information, location information and service type information about the offline service provider. The offline visit record information may include: a visit time, a visit duration and service attribute information about the offline service provider.

In the example above, a behavior of the user visiting the offline service provider may be screened out using the specified duration, in order to avoid recording a situation where the user only passes by but does not enter the service area of the offline service provider as an offline visit behavior of the user. The specified duration may be specifically set according to actual needs of the offline service provider In one implementation, in order to better protect the personal data security of the user visiting the offline service provider, the interaction between the service terminal device deployed at the offline service provider and a mobile terminal device of a visiting user may be a one-way interaction. For example, information may only be sent by the service terminal device to the mobile terminal device of the user, whereas the service terminal device may not be able to read data from the mobile terminal device of the user. For this purpose, a service terminal apparatus of the offline service provider may correspondingly broadcast the service attribute information about the offline service provider in an area where the offline service provider is located, so that when the mobile terminal device enters the area where the offline service provider is located, it can obtain the service attribute information about the offline service provider from detected broadcast information sent by the offline service provider.

In one implementation, in order to enable the mobile terminal device to quickly and conveniently acquire the service attribute information about the offline service provider visited by the user, an ultra-wide band (UWB) communication mode may be adopted between the mobile terminal device of the user and the service terminal device which may be used to send the service attribute information, i.e., the two devices may be respectively configured with a UWB chip for UWB communications.

In one implementation, the service area of the user and the interest probability of the user in the service area may be specifically obtained based on offline visit record information reported by the user according to the example below.

First, for each offline service provider visited by the user in a current statistical period, based on offline visit record information collected by the mobile terminal device in the current statistical period, an interest probability value of the user being interested in each offline service provider may be determined.

Here, based on the offline visit record information collected by the mobile terminal device of the user in the current statistical period, it may be possible to analyze which offline service providers the user has visited in the current statistical period, and visit feature data (such as a visit duration and the number of visits) of visiting each offline service provider therein, so that an interest probability value of the user being interested in each offline service provider may be obtained based on these visit feature data.

The statistical period may be used to define a time range corresponding to an offline visit record based on which the service area of the user and the interest probability of the user in the service area may be generated, e.g. a certain period of time such as the latest one month or one quarter or several days or several months in which the offline visit record of the user is generated, and the statistical period may be set by a person skilled in the art according to actual application needs.

For each offline service provider visited by the user in the current statistical period, the interest probability value of the user being interested in each offline service provider may be obtained by means of weighting a total duration and a total number of the user visiting the offline service provider in the current statistical period.

Next, the service area of the user and the interest probability distribution in the service area may be obtained, based on location information about offline service providers visited by the user in the current statistical period and interest probability values. The service area may be capable of covering locations of all the offline service providers visited by the user in the current statistical period.

Figure 6:
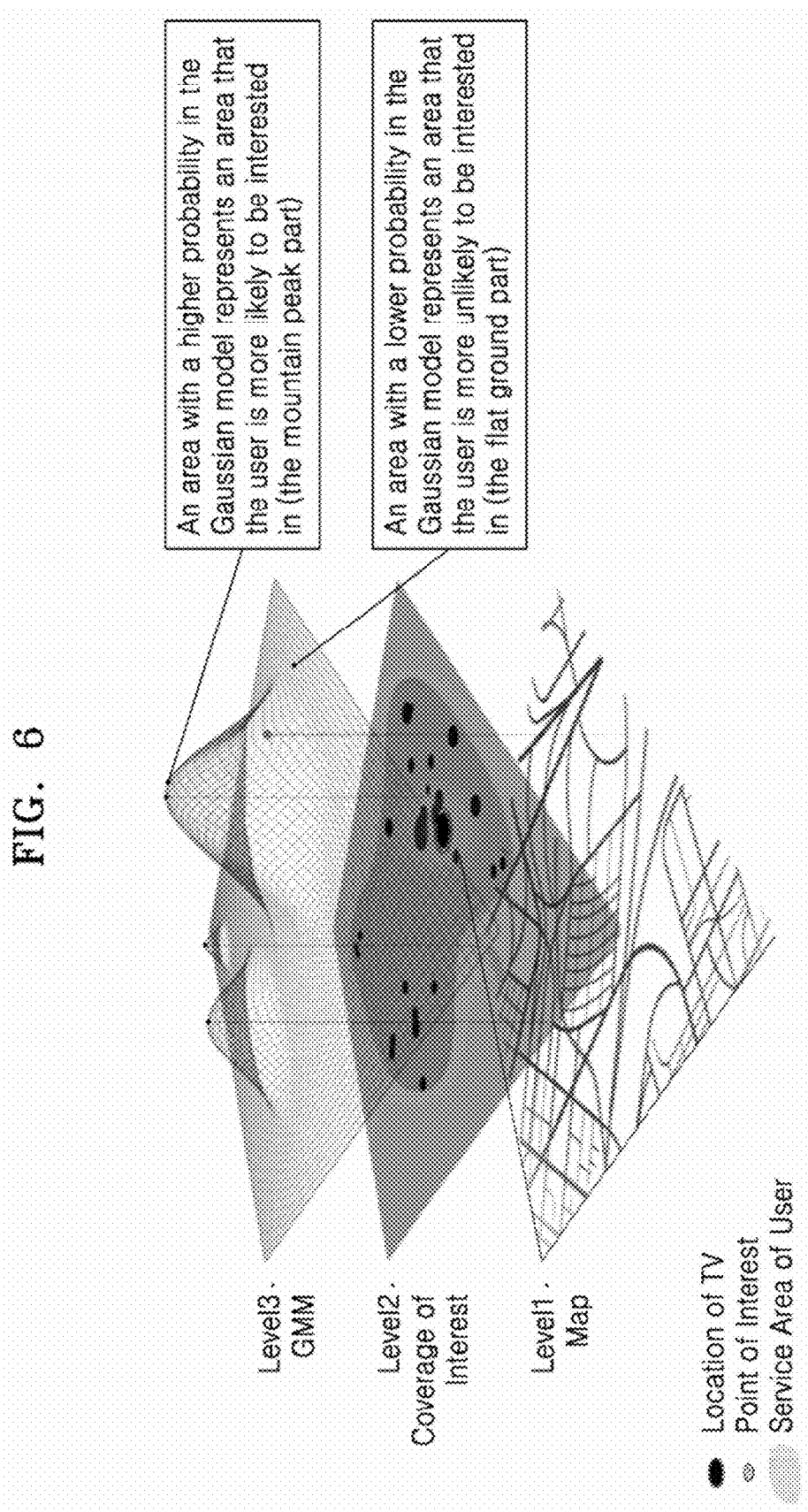
FIG. 6 is a schematic diagram of an interest probability distribution according to an embodiment.

In a specific implementation, each offline service provider visited by the user in the current statistical period may be taken as an interest node, and a geographical area capable of covering all interest nodes in the current statistical period may be determined based on all the interest nodes. This geographical area may be determined to be a geographical area of interest to the user, for example a service area of the user. Accordingly, a corresponding interest probability distribution of the user in the service area may be determined based on the interest probability value of each interest node in the service area, and thus the interest probability value of the user in each geographical location in the service area may be obtained based on the interest probability distribution. An example of this is shown in FIG. 6.

In one implementation, the interest probability distribution in the service area may be obtained by a Gaussian mixture model (GMM model) using, but not limited to, process 200 described below. The interest probability distribution in the service area may also be obtained using other methods (e.g. regression prediction based on neural networks).

Figure 2:
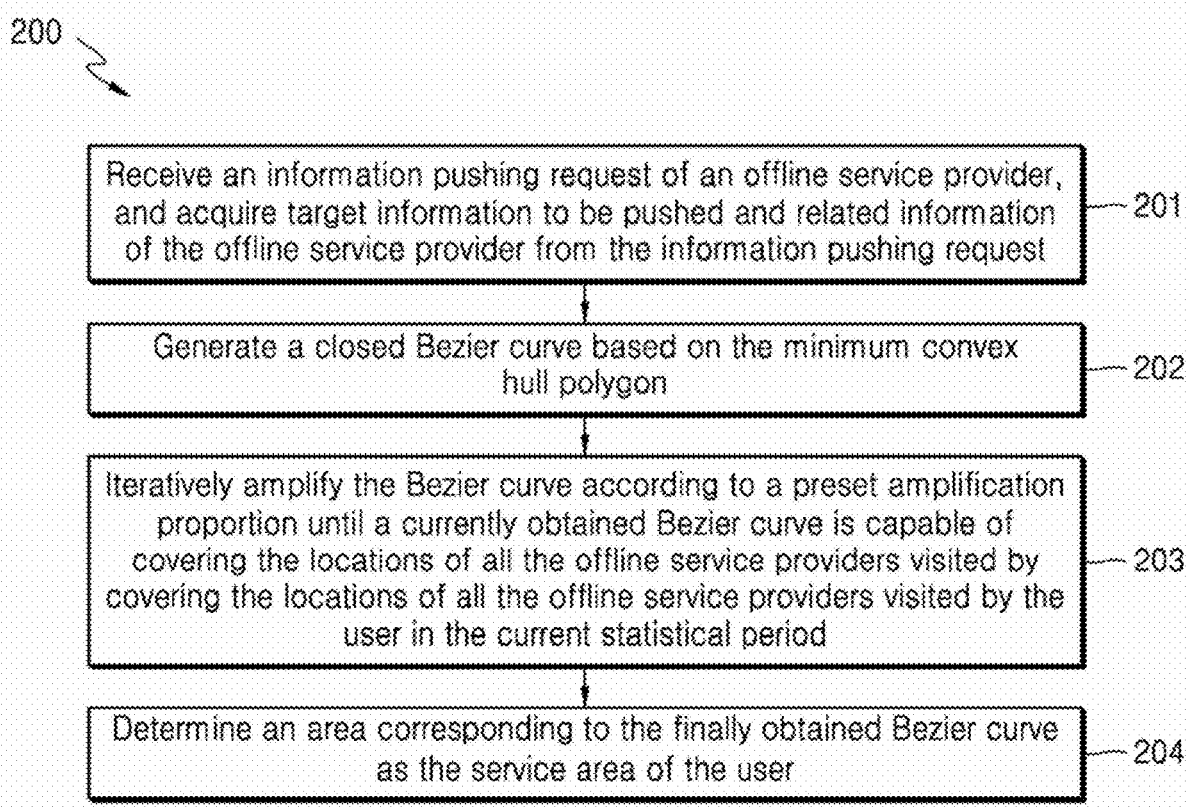
FIG. 2 is a schematic diagram of a process of obtaining a service area of a user according to an embodiment.

FIG. 2 is a schematic diagram of a process 200 of obtaining a service area of a user according to an embodiment In one implementation, as shown in FIG. 2, the service area of each user may be specifically obtained based on location information about offline service providers visited by the user in the current statistical period and the interest probability values as discussed below.

In operation 201, a corresponding minimum convex hull polygon may be generated based on geographical location information about the offline service providers visited by the user in the current statistical period.

Figure 3:
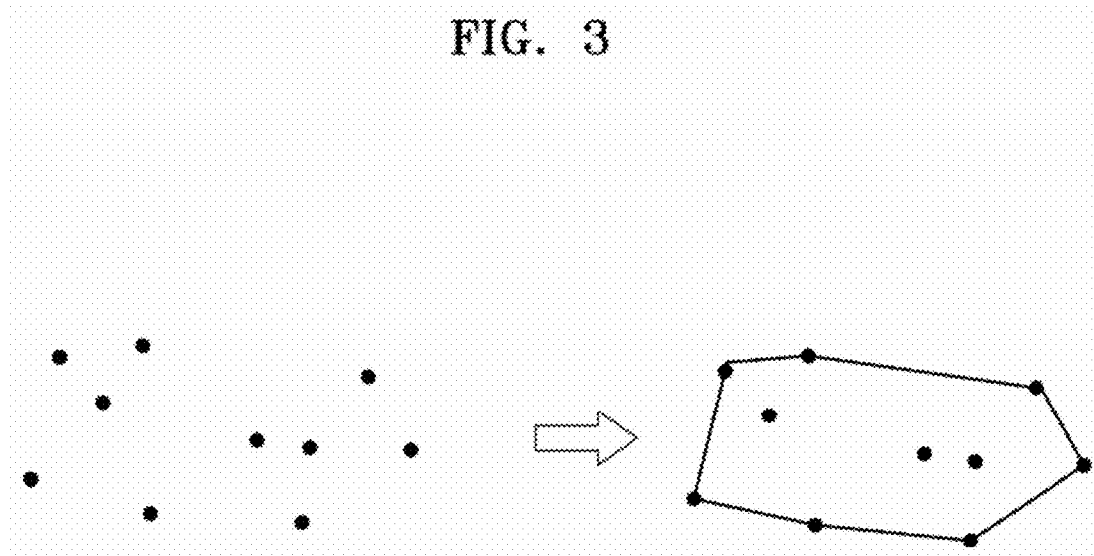
FIGS. 3 to 5 are diagrams of implementation examples corresponding to the process shown in FIG. 2, according to embodiments.

An example of a minimum convex hull polygon generated in operation 201 is shown in a graph indicated by the arrow in FIG. 3. Discrete points on the left side of the arrow in FIG. 3 represent the offline service providers visited in the current statistical period. Each point represents one offline service provider, and the location of each point may be determined by location information about the corresponding offline service provider. The vertices of the minimum convex hull polygon on the right side of the arrow in FIG. 3 include peripheral nodes in a set of the discrete interest nodes on the left side of the arrow in FIG. 3. The minimum convex hull polygon may be specifically generated using any desired method.

In operation 202, a closed Bezier curve may be generated based on the minimum convex hull polygon.

Figure 4:
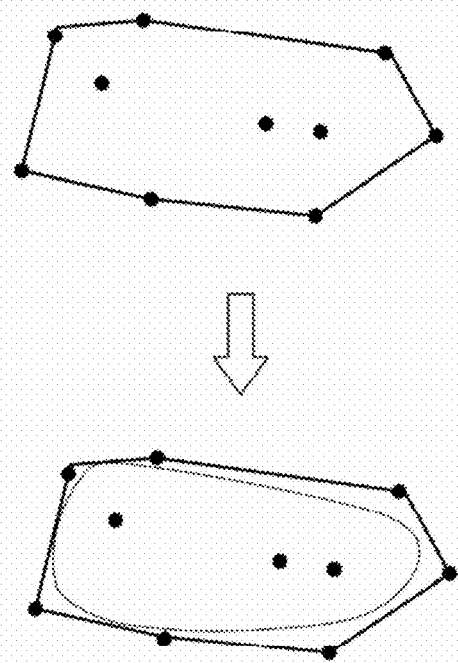

An example of a Bezier curve generated in this operation 202 is shown as a closed curve in a graph indicated by the arrow in FIG. 4, which may be specifically implemented using an existing method and will not be described in detail herein.

In operation 203, the Bezier curve may be iteratively amplified according to a preset amplification proportion until a currently obtained Bezier curve is capable of covering the locations of all the offline service providers visited by the user in the current statistical period.

In operation 203, the Bezier curve obtained in operation 202 may be gradually amplified according to a preset amplification proportion, so that the finally obtained Bezier curve can just cover the locations of all the offline service providers visited by the user in the current statistical period, and thus an area in the finally obtained Bezier curve may be determined as the service area of interest to the user.

The amplification proportion may be used to define an amplification range for each iteration, and it may be specifically set by a person skilled in the art according to actual needs.

In operation 204, an area corresponding to the finally obtained Bezier curve may be determined as the service area of the user.

Figure 5:
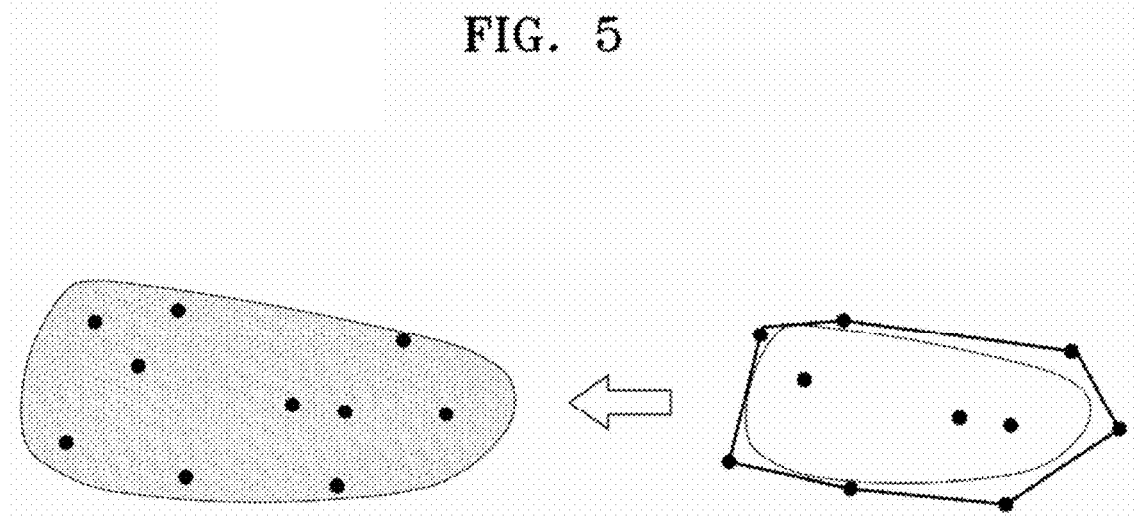

An example of a Bezier curve finally obtained in operation 204 is shown as a closed curve in a graph indicated by the arrow in FIG. 5.

In one implementation, in view that user interests tend to change dynamically over time, in order to match the service area of the user and the corresponding interest probability distribution as closely as possible to actual interests of the user, determination of the service area of the user and the interest probability distribution of the user in the service area may be triggered when any one of conditions in a preset trigger condition set is met. In order to be able to dynamically update the service area of the user and the corresponding interest probability distribution in time, and to expand interest feature data based on a service situation of a new offline service provider or an existing offline service provider in time, the condition set may be specifically obtained by any one of the following condition combinations:

The first condition may be met when a preset statistical period arrives.

The statistical period may be set by a person skilled in the art or a user according to data update needs in practical applications.

The second condition may be met when the offline visit record information received by the mobile terminal device contains a record of visiting a new offline service provider.

The third condition may be met when the offline visit record information received by the mobile terminal device contains a record of visiting an offline service provider not in the service area of the user.

Based on the above-described second condition, whenever a visit record containing a new offline service provider is received, the update of the service area of the user and the corresponding interest probability distribution may be triggered. Therefore, compared with the third condition, the update of the service area of the user and the corresponding interest probability distribution in the second condition may be timelier, but the operation overheads may be increased accordingly. In a specific application, the real-time requirements for data update and the support capability of a hardware device for the operation overheads may be comprehensively considered, and based on the above-described conditions, an appropriate time to trigger the determination of the service area of the user and the interest probability distribution of the user in the service area may be set.

Figure 7:
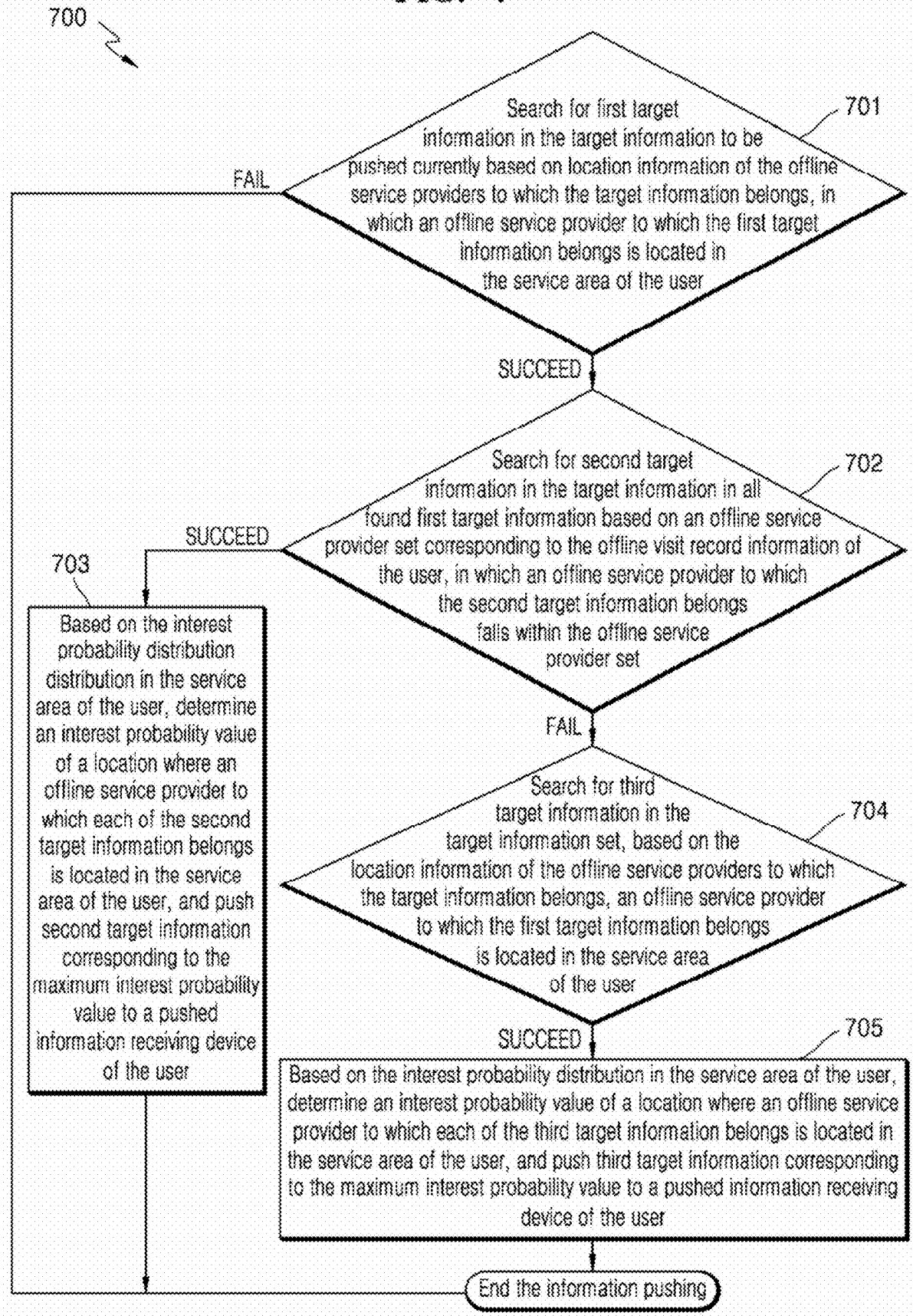
FIG. 7 is a schematic diagram of a process of pushing information to a user according to an embodiment.

FIG. 7 is a schematic diagram of a process of pushing information to a user according to an embodiment. In one implementation, as shown in FIG. 7, information may be pushed to the user in operation 102 as discussed below.

In operation 701, first target information may be searched for in the target information to be pushed currently based on location information about offline service providers to which target information belongs. Offline service providers to which the first target information belongs may be located in the service area of the user. If the search is successful, operation 702 may be executed; otherwise, it may be determined that the target information is currently not to be pushed to the user, and the process of information pushing may be terminated.

Operation 701 may be used to screen out the target information, i.e. the first target information, of the offline service providers located in the service area of the user, so that when target information is not in the service area of the user, the target information may be not pushed to the user, and thus the probability of pushing information which is not of interest to the user can be greatly reduced, and the effectiveness of pushing the information to the user can be improved.

In operation 702, second target information may be searched for in all found first target information based on an offline service provider set corresponding to the offline visit record information about the user. Offline service providers to which the second target information belongs fall within the offline service provider set. If the search is successful, operation 703 may be executed; otherwise, operation 704 may be executed.

Operation 702 may be used to search for the target information, i.e. the second target information, requested to be pushed by the offline service providers which have been visited by the user, in order to determine the information pushed to the user within the range.

In operation 703, based on the interest probability distribution in the service area of the user, an interest probability value of a location where an offline service provider to which each of the second target information belongs is located in the service area of the user may be determined, second target information corresponding to the maximum interest probability value may be pushed to a pushed information receiving device of the user, and the process of information pushing may be terminated.

Operation 703 may be used to select, within the range of target information requested to be pushed by the offline service providers which have been visited by the user, target information corresponding to the offline service provider with a maximum interest probability value of the user based on an interest probability distribution of the service area of the user, and push the target information to the user, so that the information pushed to the user is information maximally matched with user interests in the target information to be pushed currently, so that the pushed information may be matched with the user interests as much as possible.

In operation 704, third target information may be searched for in all the first target information based on a service type set of the offline service providers corresponding to the offline visit record information about the user. A service type of offline service providers to which the third target information belongs may be matched with a service type in the service type set. If the search is successful, operation 705 may be executed; otherwise, it may be determined that the target information is not currently pushed to the user, and the process of information pushing may be terminated.

Operation 705 may be used to, within the range of target information of offline service providers which are within the service area of the user but have not been visited by the user, i.e. within the range of the first target information but not within the range of the second target information, further search for target information, i.e. the third target information, with the service type of the offline service providers to which the third target information belongs being the same as the service type of the offline service providers which have ever been visited by the user, in order to search for target information with the highest user interest probability value of the offline service providers in the third type of target information and take the target information as the information to be pushed to the current user.

In operation 705, based on the interest probability distribution in the service area of the user, an interest probability value of a location where an offline service provider to which each of the third target information belongs is located in the service area of the user may be determined, and the third target information corresponding to the maximum interest probability value may be pushed to a pushed information receiving device of the user.

In practical applications, the pushed information receiving device of the user may be, but is not limited, a terminal device, such as a television set or a mobile phone, authorized by the user to receive pushed information.

Based on the above-described operations 701-705, it may be possible to push information of interest to a user as much as possible, in order to reduce the probability of pushing information which is not of interest to the user, and improve the effectiveness of pushing the information to the user. The above is merely a processing mode for preferably pushing information to a user, and in practical applications, not only the above-described method is used. For example, a reasonable information pushing matching strategy may be set according to the operation overhead and matching degree requirements in practical applications in order to realize the processing of pushing the information to the user. For example, information of only an offline service provider which has been visited by the user may be selected to be pushed to the user for simplicity.

Specific implementation details of the above-described method embodiments are illustrated below in combination with several specific application scenarios shown in FIGS. 8-11. In the examples described below, an offline service provider in a scenario is a store or merchant, target information to be pushed is advertisement information (or AD information), one store visited by a user is one point of interest of the user, a mobile terminal device for acquiring service attribute information about offline service providers visited by the user is a mobile phone with a UWB chip, and a receiving device of the user for receiving pushed information is a television set.

Figure 8:
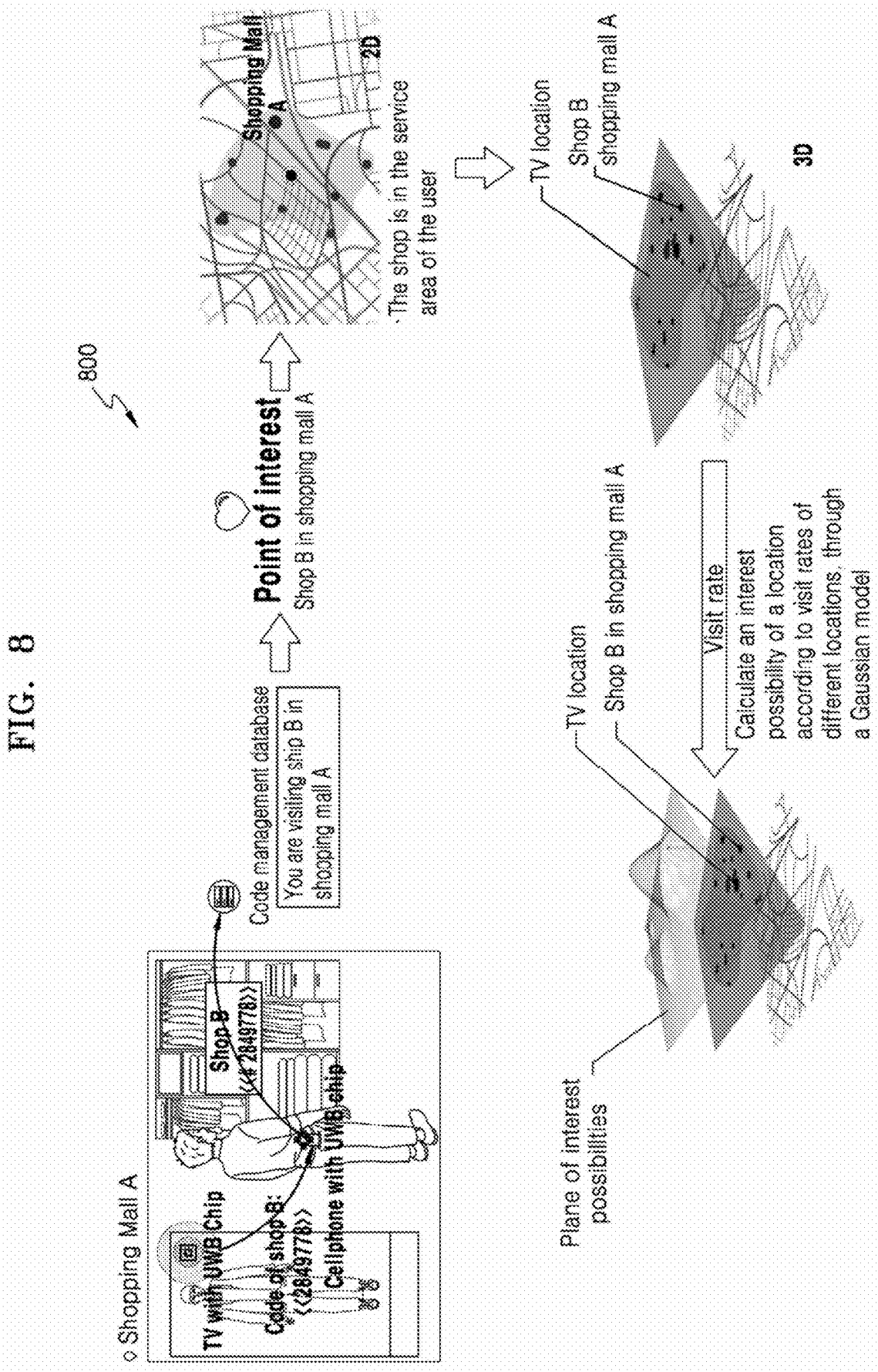
FIG. 8 is a schematic diagram of a process of determining an interest probability distribution of a user in a service area based on offline visit record information about the user in a scenario, according to an embodiment.

FIG. 8 shows a schematic diagram of a process 800 of re-determining, when an offline server provider newly visited by a user is located in a current service area of the user, an interest probability distribution of the user in the service area based on corresponding offline visit record information. As shown in FIG. 8, in this case, an interest node set corresponding to offline service providers which have been visited in the service area of the user is expanded based on the new visit, and an interest probability distribution of the user in the service area is regenerated based on the expanded interest node set.

Figure 9:
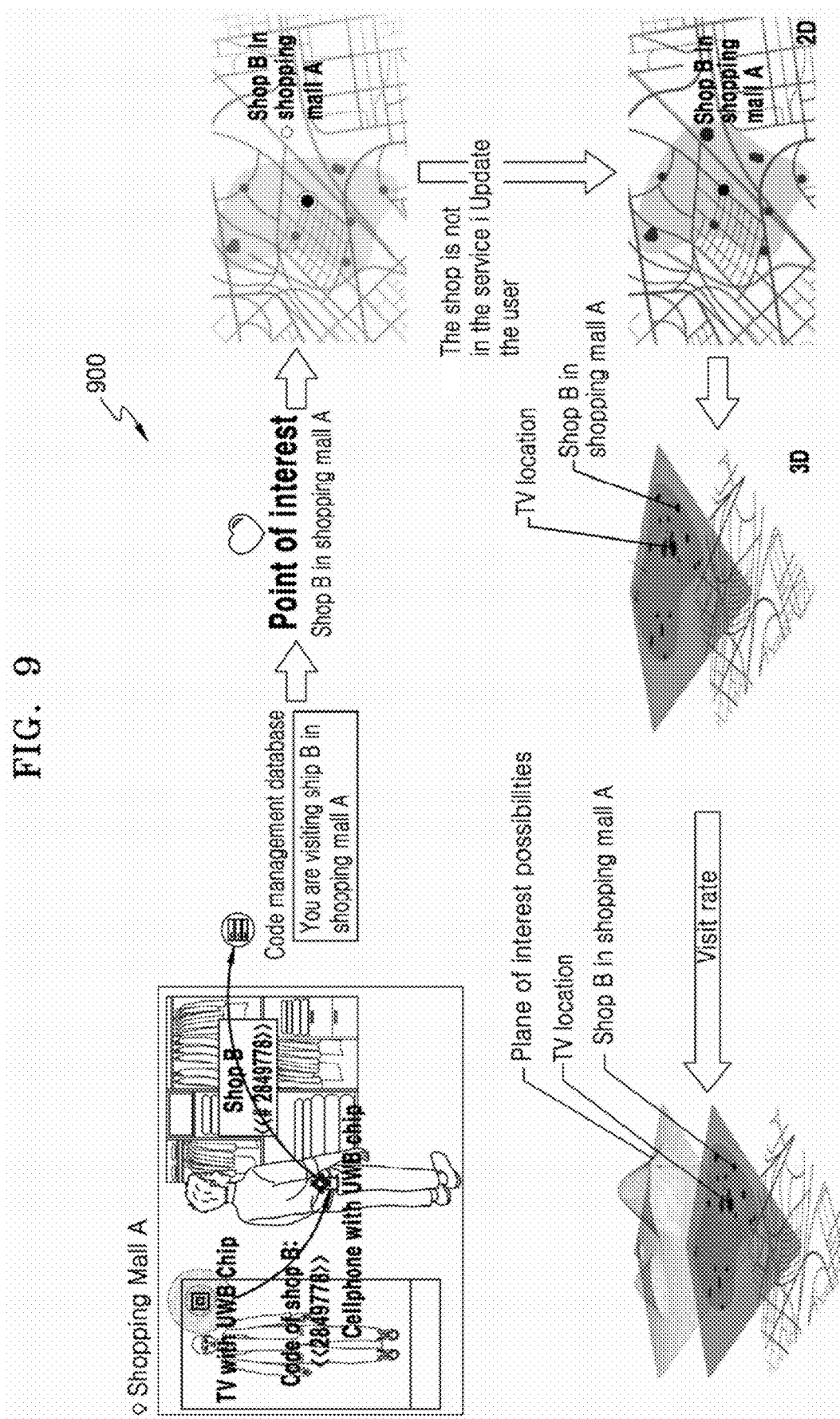
FIG. 9 is a schematic diagram of a process of determining a service area of a user and an interest probability distribution based on offline visit record information about the user in another scenario, according to an embodiment.

FIG. 9 shows a schematic diagram of a process 900 of re-determining, when an offline server provider newly visited by a user is not in a current service area of the user, the service area of the user and an interest probability distribution based on corresponding offline visit record information. As shown in FIG. 9, in this case, interest nodes corresponding to offline service providers which have been visited by the user is expanded based on the new visit, and a service area of the user and a corresponding interest probability distribution are regenerated based on the expanded interest node set.

Figure 10:
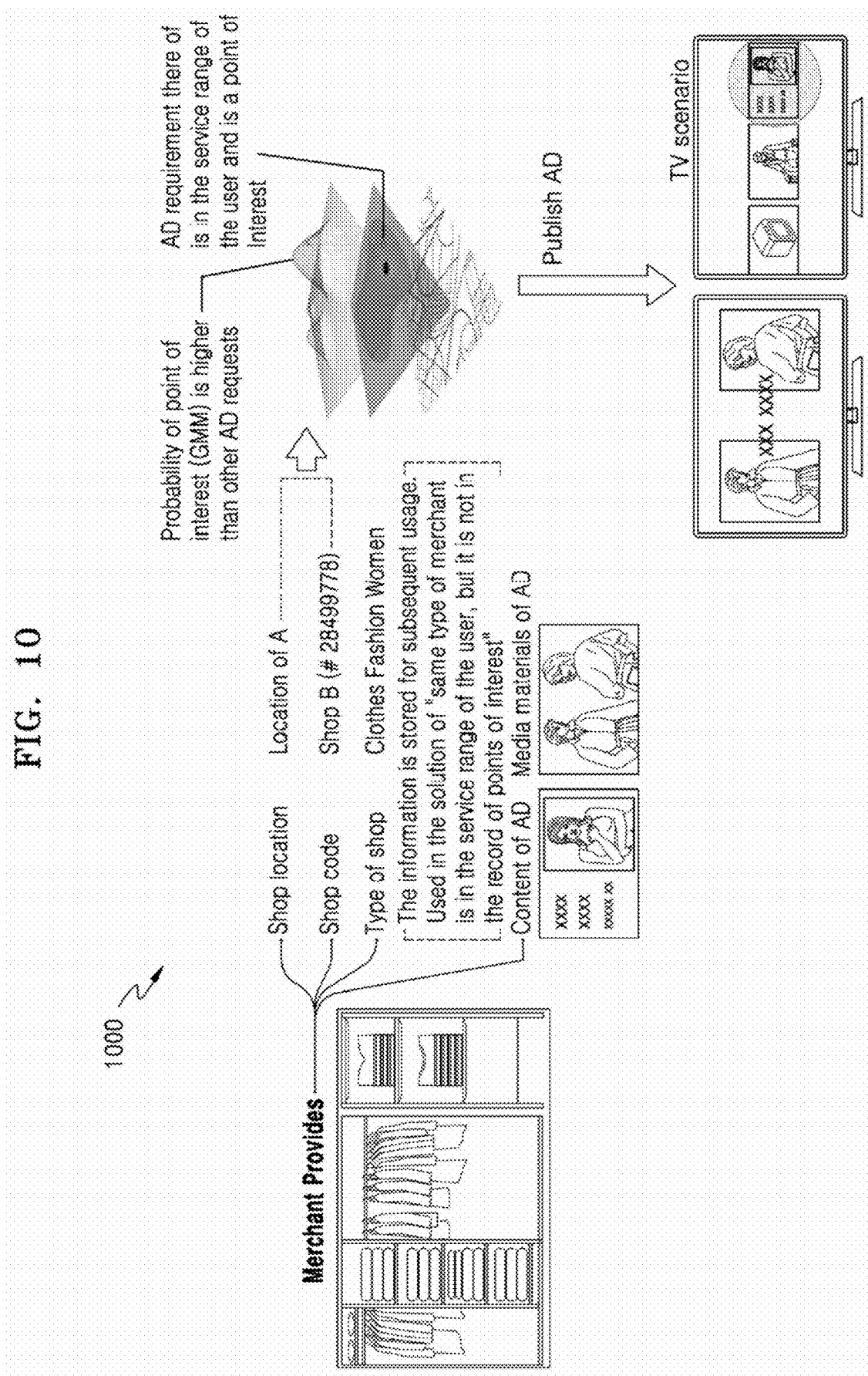
FIG. 10 is a schematic diagram of a process of pushing information to a user in a scenario, according to an embodiment.

FIG. 10 shows a schematic diagram of a process 1000 of pushing information to a user when an offline service provider (to which target information to be pushed belongs) is within a service area of the user. As shown in FIG. 10, when information pushing processing is performed, target information with the maximum interest probability value in a corresponding service area of a user is selected to be pushed to the user from the target information to be pushed currently based on an interest probability distribution in the service area of the user.

Figure 11:
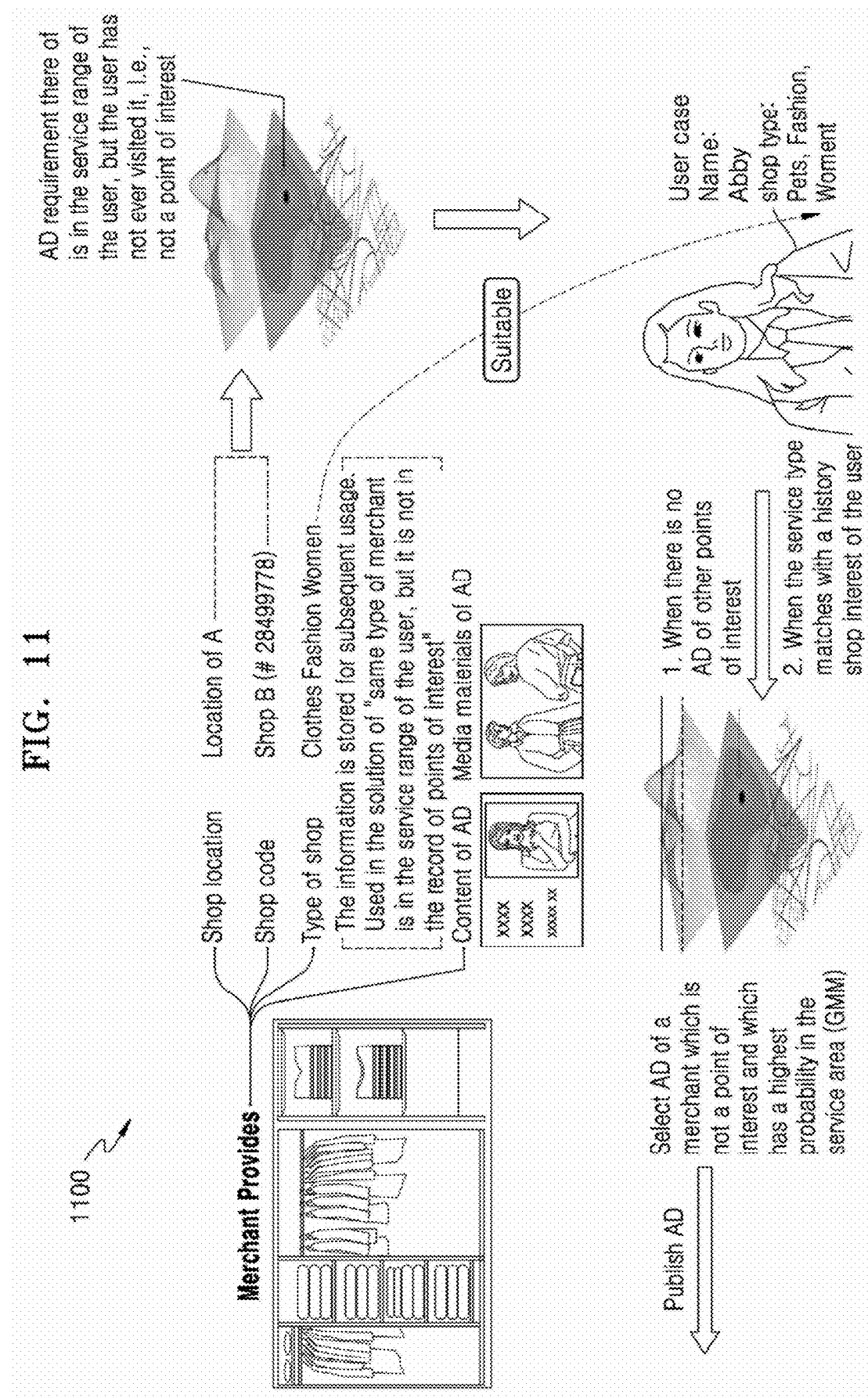
FIG. 11 is a schematic diagram of a process of pushing information to a user in another scenario, according to an embodiment.

FIG. 11 shows a schematic diagram of a process 1100 of pushing information to a user when an offline service provider (to which target information to be pushed belongs) is within a service area of the user but is not an offline service provider which has ever been visited by the user. As shown in FIG. 11, when information pushing processing is performed, there is target information belonging to an offline service provider in a service area of a user in target information to be pushed currently, but the offline service provider (to which the target information belongs) is not an offline service provider which has ever been visited by the user. In this case, it is necessary to further search for target information of a service type, of an offline service provider which has ever been accessed by the user, that is matched with a service type of the offline service provider. Then, an interest probability value of the user corresponding to an offline service provider to which each of the target information currently further found belongs is determined based on an interest probability distribution of the user in the service area, and target information corresponding to a maximum user interest probability value is selected therefrom as information to be pushed to the current user.

Based on the above-described information pushing method embodiments, embodiments of the present application relate to an information pushing apparatus. FIG. 12 is a schematic structure diagram of an information pushing apparatus 1200 according to an embodiment. As shown in FIG. 12, the information pushing apparatus 1200 may include a pushing request processing unit 1201, which may be configured to receive an information pushing request of an offline service provider, and acquire target information to be pushed and related information about the offline service provider from the information pushing request.

As further shown in FIG. 12, the information pushing apparatus 1200 may include an information pushing unit 1202, which may be configured to push, when information pushing is required, information to a user according to a principle that pushed information matches with user interests, based on the target information to be pushed currently and the related information about the offline service provider, as well as a service area of the user and an interest probability distribution of the user in the service area.

The service area and the interest probability distribution may be obtained based on offline visit record information reported by the user, and the offline visit record information may be generated based on service attribute information collected by a mobile terminal device of the user at offline service providers visited by the user.

Based on the above-described information pushing process embodiments, embodiments relate to a mobile terminal device correspondingly. The mobile terminal device may be located at a user side, and may be configured to collect, at an offline service provider visited by the user, service attribute information about the offline service provider, generate an offline visit record based on the service attribute information, and send the offline visit record to an information pushing apparatus so that the information pushing apparatus determines a service area of the user and an interest probability distribution of the user in the service area.

Based on the above-described information pushing process embodiments, embodiments relate to a service terminal device which may be located at an offline service provider side, and may be configured to send service attribute information about an offline service provider to a mobile terminal device of a user entering an area where the offline service provider is located, so that the mobile terminal device of the user may generate an offline visit record based on the service attribute information.

Because implementation principles of the above-described apparatus and terminal device embodiments and the method and process embodiments are similar, the implementations of the apparatus and methods or processes may be referred to each other, and repetitions will be omitted.

Based on the above-described information pushing process embodiments, embodiments relate to an information pushing apparatus which may include a processor and a memory. The memory may have stored therein an application executable by the processor to cause the processor to perform the information pushing process embodiments as described above. For example, it is possible to provide a system or apparatus with a storage medium on which a software program code implementing the functions of any one of implementations in the above embodiments is stored, and a computer (or a CPU or an MPU) of the system or apparatus is caused to read out and execute the program code stored in the storage medium. Moreover, some or all of actual operations may be performed by an operating system or the like operating on the computer through instructions based on the program code. The program code read out from the storage medium may also be written into a memory arranged in an expansion board inserted into the computer or into a memory arranged in an expansion unit connected to the computer, and then a CPU or the like installed on the expansion board or the expansion unit is caused to perform some or all of the actual operations through the instructions based on the program code, thereby realizing the functions of any one of the above-described implementations of the information pushing method.

The memory may be specifically implemented as various storage media such as an electrically erasable programmable read-only memory (EEPROM), a flash memory and a programmable read-only memory (PROM). The processor may be implemented to include one or more central processing units or one or more field programmable gate arrays. The field programmable gate arrays integrate one or more central processing unit cores. For example, the central processing unit or central processing unit core may be implemented as a CPU or an MCU.

Based on the above-described information pushing process embodiments, embodiments relate to a computer program product correspondingly, including computer programs/instructions which, when executed by a processor, implement the steps of the information pushing processes as described above.

It should be noted that not all the steps and modules in the above-described flowcharts and structure diagrams are necessary, and some steps or modules may be omitted according to actual requirements. The order of execution of the steps is not fixed and may be adjusted as desired. The division of various modules is merely to facilitate the description of the functional division adopted. In actual implementation, one module may be divided into a plurality of modules, the functions of the plurality of modules may also be realized by the same module, and these modules may be located in the same device or in different devices.

The hardware modules in the various implementations may be implemented mechanically or electronically. For example, one hardware module may include a specially designed permanent circuit or logic device (e.g. a dedicated processor such as an FPGA or ASIC) for performing a particular operation. The hardware module may also include a programmable logic device or circuit (e.g. including a general-purpose processor or other programmable processors) temporarily configured by software for performing a particular operation. Implementation of the hardware module mechanically, or using a dedicated permanent circuit, or using a temporarily configured circuit (e.g. configured by software) may be determined based on cost and time considerations.

"Schematic" means "serving as an instance, example, or illustration" herein, and any illustration and implementation described herein as "schematic" should not be construed as a more preferred or advantageous technical solution. For sake of clarity of the drawings, only portions of the drawings are schematically shown and are not representative of an actual structure of the product. In addition, for sake of clarity of the drawings and ease of understanding, only one of members having the same structure or function may be schematically shown or marked in some of the drawings. As used herein, "one" does not mean to limit the number of related portions to "only one", and "one" does not mean to exclude the case that the number of related portions is "more than one". As used herein, "upper", "lower", "front", "back", "left", "right", "inner", "outer", and the like are used merely to indicate relative locational relationships between related portions, and do not limit absolute locations of these related portions.

The above descriptions of embodiments are not intended to limit the scope of the disclosure. Any modification, equivalent replacement, improvement, etc. made within the spirit and principle should be included within the scope of the disclosure.

In accordance with an aspect of the disclosure, an information pushing method includes receiving an information pushing request of an offline service provider; acquiring target information to be pushed and related information about the offline service provider based on the information pushing request. An information pushing method includes, based on determining that information pushing is to be performed, pushing information to a user such that the pushed information matches with user interests, based on the target information, the related information about the offline service provider, a service area of the user, and an interest probability distribution of the user in the service area. The service area and the interest probability distribution are obtained based on offline visit record information reported by the user. The offline visit record information is generated based on service attribute information collected by a mobile terminal device of the user at offline service providers visited by the user.

Based on the mobile terminal device detecting the service attribute information in an area where the offline service provider is located, and based on a continuous detection duration of the service attribute information being longer than a predetermined duration, the mobile terminal device may be configured to determine that the user visits the offline service provider once, record the continuous detection duration as a visit duration of a current visit, and generate the offline visit record information about the current visit, wherein the service attribute information may include identification information, location information and service type information about the offline service provider, and wherein the offline visit record information about the current visit may include a visit time, the visit duration and the service attribute information about the offline service provider.

The service attribute information may be obtained by the mobile terminal device based on broadcast information sent by the offline service provider.

An ultra-wide band (UWB) communication mode may be adopted between the mobile terminal device and a service terminal device which sends the service attribute information.

The service area of the user and the interest probability distribution of the user in the service area may be determined by: for each offline service provider visited by the user in a current statistical period, based on offline visit record information collected by the mobile terminal device in the current statistical period, determining an interest probability value of the user corresponding to the each offline service provider; and obtaining the service area of the user and the interest probability distribution of the user in the service area, based on location information about offline service providers visited by the user in the current statistical period and interest probability values, wherein the service area covers locations of all of the offline service providers visited by the user in the current statistical period.

The determining the interest probability value of the user corresponding to the each offline service provider may include obtaining, for each offline service provider visited by the user in the current statistical period, the interest probability value of the user corresponding to the each offline service provider by weighting a total duration and a total number of user visits for the each offline service provider in the current statistical period.

The interest probability distribution of the user in the service area may be obtained based on a Gaussian mixture model.

The obtaining of the service area of the user may include: generating a minimum convex hull polygon based on geographical location information about the offline service providers visited by the user in the current statistical period; generating a closed Bezier curve based on the minimum convex hull polygon; iteratively amplifying the Bezier curve according to a preset amplification proportion until the amplified Bezier curve is covers locations of the all of the offline service providers visited by the user in the current statistical period; and determining an area corresponding to the amplified Bezier curve as the service area of the user.

The determining of the service area of the user and the interest probability distribution of the user in the service area may be triggered based on at least one from among an arrival of a preset statistical period, a determination that the offline visit record information received by the mobile terminal device contains a record of visiting a new offline service provider, and a determination that the offline visit record information received by the mobile terminal device contains a record of visiting an offline service provider not in the service area of the user.

The pushing of the information to the user may include: performing a first search for first target information in the target information based on location information about offline service providers to which the target information belongs, wherein offline service providers to which the first target information belongs are located in the service area of the user; based on the first search succeeding, performing a second search for second target information in the first target information based on an offline service provider set corresponding to the offline visit record information about the user, wherein offline service providers to which the second target information belongs are included in the offline service provider set; based on the second search succeeding, determining, based on the interest probability distribution of the user in the service area, an interest probability value of a location where an offline service provider to which each of the second target information belongs is located in the service area of the user, pushing second target information corresponding to a maximum interest probability value to a receiving device of the user, and terminating the pushing of the information; based on the second search failing, performing a third search for third target information in all the first target information based on a service type set of the offline service providers corresponding to the offline visit record information about the user, wherein a service type of offline service providers to which the third target information belongs is matched with a service type in the service type set; and based on the third search succeeding, determining, based on the interest probability distribution in the service area of the user, an interest probability value of a location where an offline service provider to which each of the third target information belongs is located in the service area of the user, and pushing third target information corresponding to the maximum interest probability value to the receiving device of the user, based on at least one of the first search and the third search failing, determining that the target information should not be pushed to the user, and terminating the pushing of the information.

In accordance with an aspect of the disclosure, an information pushing apparatus includes at least one processor configured to implement: a pushing request processing unit configured to receive an information pushing request of an offline service provider, and to acquire target information to be pushed and related information about the offline service provider based on the information pushing request; and an information pushing unit configured to, based on determining that information pushing is to be performed, push information to a user such that the pushed information matches with user interests, based on the target information, the related information about the offline service provider, a service area of the user, and an interest probability distribution of the user in the service area, wherein the service area and the interest probability distribution are obtained based on offline visit record information reported by the user, and wherein the offline visit record information is generated based on service attribute information collected by a mobile terminal device of the user at offline service providers visited by the user.

In accordance with an aspect of the disclosure, a mobile terminal device of a user includes at least one processor configured to: collect, at an offline service provider visited by the user, service attribute information about the offline service provider, generate an offline visit record based on the service attribute information, and send the offline visit record to an information pushing apparatus to allow the information pushing apparatus to determine a service area of the user and an interest probability distribution of the user in the service area.

In accordance with an aspect of the disclosure, a service terminal device located at an offline service provider includes at least one processor configured to send service attribute information about an offline service provider to a mobile terminal device of a user entering an area where the offline service provider is located to allow the mobile terminal device of the user to generate an offline visit record based on the service attribute information.

In accordance with an aspect of the disclosure, an information pushing apparatus includes at least one processor; and a memory, wherein the memory may be configured to store instructions which, when executed by the at least one processor, cause the at least one processor to perform the information pushing methods discussed herein.

In accordance with an aspect of the disclosure, a non-transitory computer-readable storage medium, stores computer-readable instructions which, when executed at least one processor, cause the at least one processor to perform the information pushing methods discussed herein.

In accordance with an aspect of the disclosure, a non-transitory computer program product stores computer instructions which, when executed by at least one processor, cause the at least one processor to perform the information pushing method discussed herein.

Each of the embodiments provided in the above description is not excluded from being associated with one or more features of another example or another embodiment also provided herein or not provided herein but consistent with the inventive concept. For example, even if matters described in a specific example or embodiment are not described in a different example or embodiment, the matters may be understood as being related to or combinable with the different example or embodiment, unless otherwise mentioned in descriptions thereof. In addition, it should be understood that all descriptions of principles, aspects, examples, and specific embodiments of the inventive concept are intended to encompass structural and functional equivalents thereof. In addition, these equivalents should be understood as including not only currently well-known equivalents but also equivalents to be developed in the future, that is, all devices invented to perform the same functions regardless of the structures thereof.

What is claimed is:

1. An information pushing method, comprising:
receiving an information pushing request of an offline service provider;
acquiring target information to be pushed and related information about the offline service provider based on the information pushing request; and
based on determining that information pushing is to be performed, pushing information to a user such that the pushed information matches with user interests, based on the target information, the related information about the offline service provider, a service area of the user, and an interest probability distribution of the user in the service area,
wherein the service area and the interest probability distribution are obtained based on offline visit record information reported by the user,
wherein the offline visit record information is generated based on service attribute information collected by a mobile terminal device of the user at offline service providers visited by the user, and
wherein the service area is bounded by a curve generated based on geographical location information about the offline service providers visited by the user.

2. The method according to claim 1, wherein based on the mobile terminal device detecting the service attribute information in an area where the offline service provider is located, and based on a continuous detection duration of the service attribute information being longer than a predetermined duration, the mobile terminal device is configured to determine that the user visits the offline service provider once, record the continuous detection duration as a visit duration of a current visit, and generate the offline visit record information about the current visit,
wherein the service attribute information comprises identification information, location information and service type information about the offline service provider, and
wherein the offline visit record information about the current visit comprises a visit time, the visit duration and the service attribute information about the offline service provider.

3. The method according to claim 1, wherein the service attribute information is obtained by the mobile terminal device based on broadcast information sent by the offline service provider.

4. The method according to claim 1, wherein an ultra-wide band (UWB) communication mode is adopted between the mobile terminal device and a service terminal device which sends the service attribute information.

5. The method according to claim 1, wherein the service area of the user and the interest probability distribution of the user in the service area are determined by:
   for each offline service provider visited by the user in a current statistical period, based on offline visit record information collected by the mobile terminal device in the current statistical period, determining an interest probability value of the user corresponding to the each offline service provider; and
   obtaining the service area of the user and the interest probability distribution of the user in the service area, based on location information about offline service providers visited by the user in the current statistical period and interest probability values, wherein the service area covers locations of all of the offline service providers visited by the user in the current statistical period.

6. The method according to claim 5, wherein the determining the interest probability value of the user corresponding to the each offline service provider comprises obtaining, for each offline service provider visited by the user in the current statistical period, the interest probability value of the user corresponding to the each offline service provider by weighting a total duration and a total number of user visits for the each offline service provider in the current statistical period.

7. The method according to claim 5, wherein the interest probability distribution of the user in the service area is obtained based on a Gaussian mixture model.

8. The method according to claim 5, wherein the obtaining of the service area of the user comprises:
   generating a minimum convex hull polygon based on geographical location information about the offline service providers visited by the user in the current statistical period;
   generating a closed Bezier curve based on the minimum convex hull polygon;
   iteratively amplifying the Bezier curve according to a preset amplification proportion until the amplified Bezier curve is covers locations of the all of the offline service providers visited by the user in the current statistical period; and
   determining an area corresponding to the amplified Bezier curve as the service area of the user.

9. The method according to claim 1, wherein the determining of the service area of the user and the interest probability distribution of the user in the service area is triggered based on at least one from among an arrival of a preset statistical period, a determination that the offline visit record information received by the mobile terminal device contains a record of visiting a new offline service provider, and a determination that the offline visit record information received by the mobile terminal device contains a record of visiting an offline service provider not in the service area of the user.

10. The method according to claim 1, wherein the pushing of the information to the user comprises:
    performing a first search for first target information in the target information based on location information about offline service providers to which the target information belongs, wherein offline service providers to which the first target information belongs are located in the service area of the user;
    based on the first search succeeding, performing a second search for second target information in the first target information based on an offline service provider set corresponding to the offline visit record information about the user, wherein offline service providers to which the second target information belongs are included in the offline service provider set;
    based on the second search succeeding, determining, based on the interest probability distribution of the user in the service area, an interest probability value of a location where an offline service provider to which each of the second target information belongs is located in the service area of the user, pushing second target information corresponding to a maximum interest probability value to a receiving device of the user, and terminating the pushing of the information;
    based on the second search failing, performing a third search for third target information in all the first target information based on a service type set of the offline service providers corresponding to the offline visit record information about the user, wherein a service type of offline service providers to which the third target information belongs is matched with a service type in the service type set;
    based on the third search succeeding, determining, based on the interest probability distribution in the service area of the user, an interest probability value of a location where an offline service provider to which each of the third target information belongs is located in the service area of the user, and pushing third target information corresponding to the maximum interest probability value to the receiving device of the user, and
    based on at least one of the first search and the third search failing, determining that the target information should not be pushed to the user, and terminating the pushing of the information.

11. An information pushing apparatus comprising:
    at least one processor; and
    a memory,
    wherein the memory is configured to store instructions which, when executed by the at least one processor, cause the at least one processor to:
    receive an information pushing request of an offline service provider, and to acquire target information to be pushed and related information about the offline service provider based on the information pushing request; and
    based on determining that information pushing is to be performed, push information to a user such that the pushed information matches with user interests, based on the target information, the related information about the offline service provider, a service area of the user, and an interest probability distribution of the user in the service area,
    wherein the service area and the interest probability distribution are obtained based on offline visit record information reported by the user,
    wherein the offline visit record information is generated based on service attribute information collected by a mobile terminal device of the user at offline service providers visited by the user, and wherein the service area is bounded by a curve generated based on geographical location information about the offline service providers visited by the user.

12. The information pushing apparatus of claim 11, wherein based on the mobile terminal device detecting the service attribute information in an area where the offline service provider is located, and based on a continuous detection duration of the service attribute information being longer than a predetermined duration, the mobile terminal device is configured to determine that the user visits the offline service provider once, record the continuous detection duration as a visit duration of a current visit, and generate the offline visit record information about the current visit, wherein the service attribute information comprises identification information, location information and service type information about the offline service provider, and wherein the offline visit record information about the current visit comprises a visit time, the visit duration and the service attribute information about the offline service provider.

13. The information pushing apparatus of claim 11, wherein the service attribute information is obtained by the mobile terminal device based on broadcast information sent by the offline service provider.

14. The information pushing apparatus of claim 11, wherein an ultra-wide band (UWB) communication mode is adopted between the mobile terminal device and a service terminal device which sends the service attribute information.

15. A non-transitory computer-readable storage medium, storing computer-readable instructions which, when executed at least one processor, cause the at least one processor to:

receive an information pushing request of an offline service provider;

acquire target information to be pushed and related information about the offline service provider based on the information pushing request; and based on determining that information pushing is to be performed, push information to a user such that the pushed information matches with user interests, based on the target information, the related information about the offline service provider, a service area of the user, and an interest probability distribution of the user in the service area, wherein the service area and the interest probability distribution are obtained based on offline visit record information reported by the user, wherein the offline visit record information is generated based on service attribute information collected by a mobile terminal device of the user at offline service providers visited by the user, and wherein the service area is bounded by a curve generated based on geographical location information about the offline service providers visited by the user.

* * * * *